(12) United States Patent
Guerin et al.

(10) Patent No.: US 10,721,871 B2
(45) Date of Patent: Jul. 28, 2020

(54) WRAPPING ARRANGEMENT AND ROUND BALER WITH SUCH

(71) Applicant: Deere & Company, Moline, IL (US)

(72) Inventors: Sebastien Guerin, Audeux (FR); David Roussel, Saint Seine en Bache (FR); Emmanuel Chapon, Velet (FR)

(73) Assignee: DEERE & COMPANY, Moline, IL (US)

( * ) Notice: Subject to any disclaimer, the term of this patent is extended or adjusted under 35 U.S.C. 154(b) by 291 days.

(21) Appl. No.: 15/896,864

(22) Filed: Feb. 14, 2018

(65) Prior Publication Data

US 2018/0279559 A1 Oct. 4, 2018

(30) Foreign Application Priority Data

Mar. 31, 2017 (EP) ..................................... 17164261

(51) Int. Cl.
*A01F 15/07* (2006.01)
*A01F 15/14* (2006.01)

(52) U.S. Cl.
CPC ........ *A01F 15/0715* (2013.01); *A01F 15/071* (2013.01); *A01F 15/141* (2013.01); *A01F 2015/072* (2013.01); *A01F 2015/073* (2013.01); *A01F 2015/0735* (2013.01)

(58) Field of Classification Search
CPC ................. A01F 15/071; A01F 15/0715; A01F 2015/072; A01F 2015/0725; A01F 2015/073; A01F 2015/0735; A01F 2015/075; A01F 15/141; B65B 11/025; B65B 11/045; B65B 2210/20

USPC ....................... 53/587, 588, 389.3; 100/5, 15
See application file for complete search history.

(56) References Cited

U.S. PATENT DOCUMENTS

| | | | | |
|---|---|---|---|---|
| 2,792,775 A | * | 5/1957 | Beyette | B65B 25/02 100/13 |
| 4,300,326 A | * | 11/1981 | Stackhouse | B65B 11/045 53/211 |
| 5,170,612 A | * | 12/1992 | Sumino | B65B 13/08 53/589 |

(Continued)

FOREIGN PATENT DOCUMENTS

| | | | | |
|---|---|---|---|---|
| CA | 2418366 A1 | * | 2/2002 | ........... B65B 11/025 |
| CA | 2343703 A1 | * | 10/2002 | ........... B65B 11/025 |

(Continued)

OTHER PUBLICATIONS

EPO machine translation of EP1541008, retrieved from espacenet.com on Jan. 29, 2020, 10 pages. (Year: 2019).*

(Continued)

*Primary Examiner* — Stephen F. Gerrity

(57) ABSTRACT

A wrapping arrangement for an agricultural round baler includes a support frame and a wrapping mechanism including at least one wrap material feeder mounted on the support frame. The wrap material feeder includes a supply of wrap material. At least one wrap material clamp and cutting device is operably mounted to the wrap material feeder, and a clamp mechanism is mounted proximate to the wrap material clamp and cutting device. The clamp mechanism is adapted to clamp a free end of the wrap material by a biasing clamping force for pre-positioning the wrap material for functional operation with the wrapping mechanism.

12 Claims, 5 Drawing Sheets

(56) References Cited

U.S. PATENT DOCUMENTS

| | | | | |
|---|---|---|---|---|
| 5,189,866 | A | * 3/1993 | Krutza | A01F 15/071 53/211 |
| 5,442,893 | A | * 8/1995 | Soderberg | A01F 15/071 53/211 |
| 5,941,049 | A | * 8/1999 | Lancaster, III et al. | B65B 11/045 53/399 |
| 2002/0043053 | A1 | * 4/2002 | Trottet | B65B 11/045 53/582 |
| 2002/0124529 | A1 | * 9/2002 | van der Lely | A01F 15/071 53/411 |
| 2004/0177597 | A1 | * 9/2004 | Dougherty | A01F 15/071 53/465 |
| 2014/0215968 | A1 | * 8/2014 | Johnson et al. | B65B 11/025 53/399 |

FOREIGN PATENT DOCUMENTS

| | | | | |
|---|---|---|---|---|
| CA | 2381190 | A1 * | 10/2002 | B65B 11/025 |
| DE | 3805224 | A1 * | 8/1989 | A01F 15/07 |
| DE | 9116539 | U1 * | 1/1993 | B65B 11/025 |
| EP | 1386532 | A1 * | 2/2004 | B65B 11/025 |
| EP | 1541008 | A1 | 6/2005 | |
| FR | 2679105 | A1 * | 1/1993 | A01F 15/071 |
| GB | 2204850 | A | 11/1988 | |
| GB | 2249077 | A | 4/1992 | |
| JP | 03065122 | A * | 3/1991 | B65B 11/025 |
| JP | 05170211 | A * | 7/1993 | 53/211 |
| WO | WO-0036903 | A1 * | 6/2000 | A01F 15/071 |
| WO | WO-0076851 | A1 * | 12/2000 | B65B 11/04 |
| WO | 2005009112 | A2 | 2/2005 | |

OTHER PUBLICATIONS

European Search Report issued in counterpart application No. 17164261.4 dated Jun. 19, 2017. (7 pages).

* cited by examiner

WRAPPING ARRANGEMENT AND ROUND BALER WITH SUCH

RELATED APPLICATIONS

This application claims priority to European Patent Application Ser. No. 17164261.4, filed Mar. 31, 2017, the disclosure of which is hereby expressly incorporated by reference in its entirety.

FIELD OF THE DISCLOSURE

The present disclosure relates to a wrapping arrangement for round balers and, more particularly, relates to a clamp mechanism for clamping wrap material dispensed for wrapping a bale.

BACKGROUND

Baler-wrapper combinations are well known for agricultural machines. They may include a round baler including a bale pressing chamber combined with a bale wrapping arrangement attachable to said round baler. The bale pressing chamber receives the crop products. The bale pressing chamber has pressing elements for pressing the crop products therewithin into a cylindrical bale. After the bale is formed, the bale might be guided to the bale wrapping arrangement having a wrap material supply for introducing a wrap material into the bale wrapping arrangement. The round bales are wrapped with the wrap material around the periphery of a bale.

The wrapping arrangement may include a support table on which a pressed bale can be placed for being wrapped. The support table includes means for providing a rotation to the bale around its center rotation axis. Additionally, one or more wrapping arms equipped with wrapping material are being rotated around the bale in order to wrap the bale by layers of wrap material. The combined movements of the rotating bale and the rotating arm(s) provide a wrapping of layers of the wrap material around the outer surfaces of the bale. At an onset of starting the wrapping of an agricultural bale or when a wrap material supply roll needs to be replaced, the wrapping material needs to be prepared, such that a starting portion of wrap material is unwound from a wrap material supply roll and stretched into a wrapping position by clamping the free end of wrap material into a clamping and cutting arrangement. The clamping and cutting arrangement holds the wrap material under tension in the stretched position and is further equipped with cutting means in order to separate the wrapped material from the remaining wrap material on the supply roll after completion of a bale wrapping cycle. Thus, the wrap material is cut-off, by a wrap material clamp and cutting device of the bale wrapping arrangement, such that, the portion of the wrap material enclosing the bale is separated from the wrap material supply.

In conventional balers, the operator is required to prepare the wrap material manually and to clamp the wrap material free end onto the clamping and cutting arrangement. This operation is time consuming and further poses safety concerns to the operator as the wrap material cutting arrangement is required to be handled. In case the operator is inadvertent, this may lead to accidents. Some attempts have been made to facilitate this operation and to avoid accidents by forming a knot on the free end of the wrap material and placing the free end in a slot in order to hold the free end under tension when setting up (preparing) the wrapping arrangement. The provided slot may hold the free end of the wrap material and the formed knot may avoid the free end from slipping through the slot, so that a stretching operation is provided when the wrapping arm starts rotating. Disadvantageously, when the first wrapping cycle is completed and it comes to the separation of wrapped material from the supply roll the free end which has been inserted in the slot may be tension released and falls down to the ground where it needs to be collected by the operator.

Thus, the present disclosure provides an improved solution to avoid above mentioned disadvantage and to provide safe operating condition to the operator while handling the wrap material during setting up of the agricultural baler for operation thereof.

SUMMARY

In this disclosure, a wrapping arrangement and round baler is presented by eliminating the requirement of an operator in handling of a cutting means in the agricultural baler, thereby, avoiding accidents. In one embodiment, a wrapping arrangement for an agricultural round baler includes a support frame, a wrapping mechanism with at least one wrap material feeding means mounted on the support frame, and at least one wrap material clamp and cutting device operably mounted in functional relation to at least one wrap material feeding means. The wrap material feeding means includes a supply of wrap material.

The wrapping arrangement is characterized by a clamp mechanism mounted proximate to the at least one wrap material clamp and cutting device. The clamp mechanism is adapted to clamp a free end of the wrap material by a biasing clamping force for pre-positioning the wrap material for functional operation with the wrapping mechanism. The free end of the wrap material remains clamped to the clamp arrangement until it is removed by intervention of the operator or any further intentional operation.

The clamp mechanism includes at least one profiled resilient element mounted on a support frame member of the bale wrapping mechanism. The profiled resilient element is displaceable between an operative clamping configuration and an operative de-clamping configuration. The profiled resilient element may be fixed at one end to the support frame. Alternatively, the profiled resilient element may be hinged at one end to the support frame.

The clamp mechanism further includes a stationary element functionally operable with the profiled resilient element. The stationary element is provided on the support frame member of the bale wrapping mechanism. The stationary element is integrally formed on the support frame member of the wrapping mechanism. Alternatively, the stationary element may be discretely mounted on the support frame member of the wrapping mechanism.

In the operative clamping configuration, the profiled resilient element applies a clamping force against the stationary element. In the operative de-clamping configuration, the profiled resilient element is displaced away from the stationary element, thereby relieving the clamping force. The profiled resilient element is displaceable from the operative clamping configuration to the operative de-clamping configuration by applying a displacement force, the displacement force generates elastic energy in the profiled resilient element.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
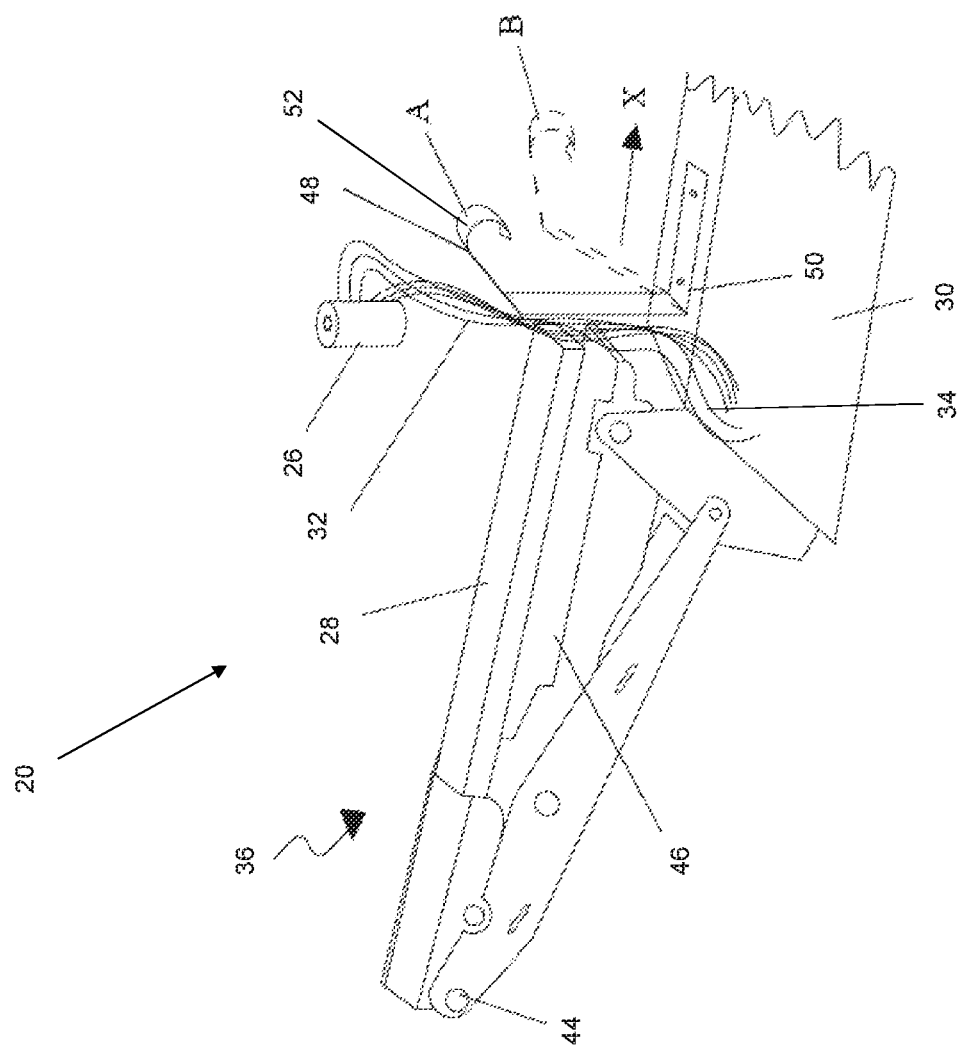
FIG. 1 is a schematic of a first embodiment of a clamp mechanism of a wrapping arrangement for an agricultural round baler.

An agricultural round baler 10 is mounted on a support frame 12 of a chassis 14 and includes a baling chamber 16, a wrapping arrangement 18, and a wrap material clamp and cutting device 20. A wrapping mechanism 22 with at least one wrap material feeding means 24 is mounted on the support frame 12. The wrap material feeding means 24 includes a wrap material supply 26. FIGS. 1-4 illustrate a portion of the wrapping arrangement 18 having the wrap material clamp and cutting device 20 with a cutting knife 28 supported on a supported frame member 30 and the wrap material supply 26 supplying wrap material 32. The wrap material clamp and cutting device 20 is operably mounted in functional relation to the wrap material feeding means 24.

In preparing the agricultural baler 10 for the baling operation, the operator of the round agricultural baler 10 is required to position a free end 34 of the wrap material 32, dispensed from the wrap material supply body 26, such that the free end 34 is clamped by a clamp mechanism 36, 38, 40, 42 to the support frame member 30. In accordance with the present disclosure, FIGS. 1-4 illustrate different embodiments of the clamp mechanism 36, 38, 40, 42 for an agricultural round baler 10 for clamping the free end 34 of the wrap material 32 on the support frame member 30, proximate to the cutting knife 28. The clamp mechanism 36, 38, 40, 42 of the agricultural round baler 10, illustrated in FIGS. 1-4, generally referenced by the numerals 36, 38, 40, 42 are used for clamping of wrap materials 32 used in balers 10 for wrapping of formed bales. The clamp mechanism 36, 38, 40, 42 is provided on the support frame member 30.

The agricultural round baler 10 is adapted to be towed across a field by an agricultural tractor (not shown) so as to take up harvested crop, such as silage grass, compress the crop into bales, and finally to wrap the bales in an airtight covering with the wrapping material 32. The wrapping material 32 may be a plastic sheet, net, twine or the like.

The remains of the harvested crop is fed into the baling chamber 16 where the remains are processed and a bale starts to form. Once the bale chamber 16 is filled or a bale has reached its desired size, no further crop shall be supplied to the bale chamber 16. At this stage, the wrapping arrangement 18 is activated and the bale is continuously rotated while the wrap material 32 is fed such that the wrapping material 32 starts to be wrapped onto the exterior of the bale.

The cutting knife 28 is swingably mounted on a transverse pivot 44. The cutting knife 28 is positioned in a resting configuration on an anvil 46. The free end 34 of the wrap material 32 is clamped by the clamp mechanism 36, 38, 40, 42 such that a portion of the free end 34 of the wrap material 32 extends beyond the clamp mechanism 36, 38, 40, 42. The clamp mechanism 36, 38, 40, 42 is provided on the support frame member 30 so as to be proximate the cutting knife 28. The clamp mechanism 36, 38, 40, 42 applies a biasing clamping force to clamp the free end 34 of the wrap material 32 by a biasing clamping force for pre-positioning the wrap material 32 for functional operation with the wrapping mechanism 22.

In the embodiment illustrated in FIG. 1, the clamp mechanism 36 is formed by a profiled resilient element 48 and the end of a cutting knife 28 of the wrap material clamp and cutting device 20. The profiled resilient element 48 is mounted on the support frame member 30 of the bale wrapping mechanism 22. The profiled resilient element 48 has a fixed end 50 and a free end 52, distal from the fixed end 50. The fixed end 50 is fixedly mounted to the support frame member 30. The clamp mechanism 36 includes a clamping portion (not particularly indicated) between the free end 52 and the fixed end 50. The profiled resilient element 48 is displaceable between an operative clamping configuration A and an operative de-clamping configuration B. The profiled resilient element 48 is required to be displaced to the operative de-clamping configuration B in the direction X by a displacement force. The profiled resilient element 48, due to its resilient nature, tends to return to the operative clamping configuration A.

In preparing the agricultural baler 10, the operator is required to displace the profiled resilient element 48 to the operative de-clamping configuration B. Thereafter, the free end 34 of the wrap material 32 extending from the wrap material supply body 26 is positioned between the profiled resilient element 48 and the end of the cutting knife 28 by the biasing clamping force.

Once the wrapping of the bale is complete, the cutting knife 28 is actuated to be displaced from the resting configuration, as illustrated in FIG. 1, about the pivot 44 to a pre-severing configuration. Thereafter, the cutting knife 28 is displaced back to the resting configuration. While moving from the pre-severing configuration to the resting configuration, the cutting knife 28 severs the wrap material 32, close to the profiled resilient element 48, in between the profiled resilient element 48 and the wrap material supply 26. After severing the wrap material 32, the subsequent free end of the wrap material 32, thus formed, is gripped between the cutting knife 28 and the anvil 46. The portion of the free end 34 of the wrap material 32, which had been clamped by the clamping mechanism 36, remains held on to the profiled resilient element 48 due to the provided clamping force until removed by intervention of the operator or any further intentional operation.

Figure 2:
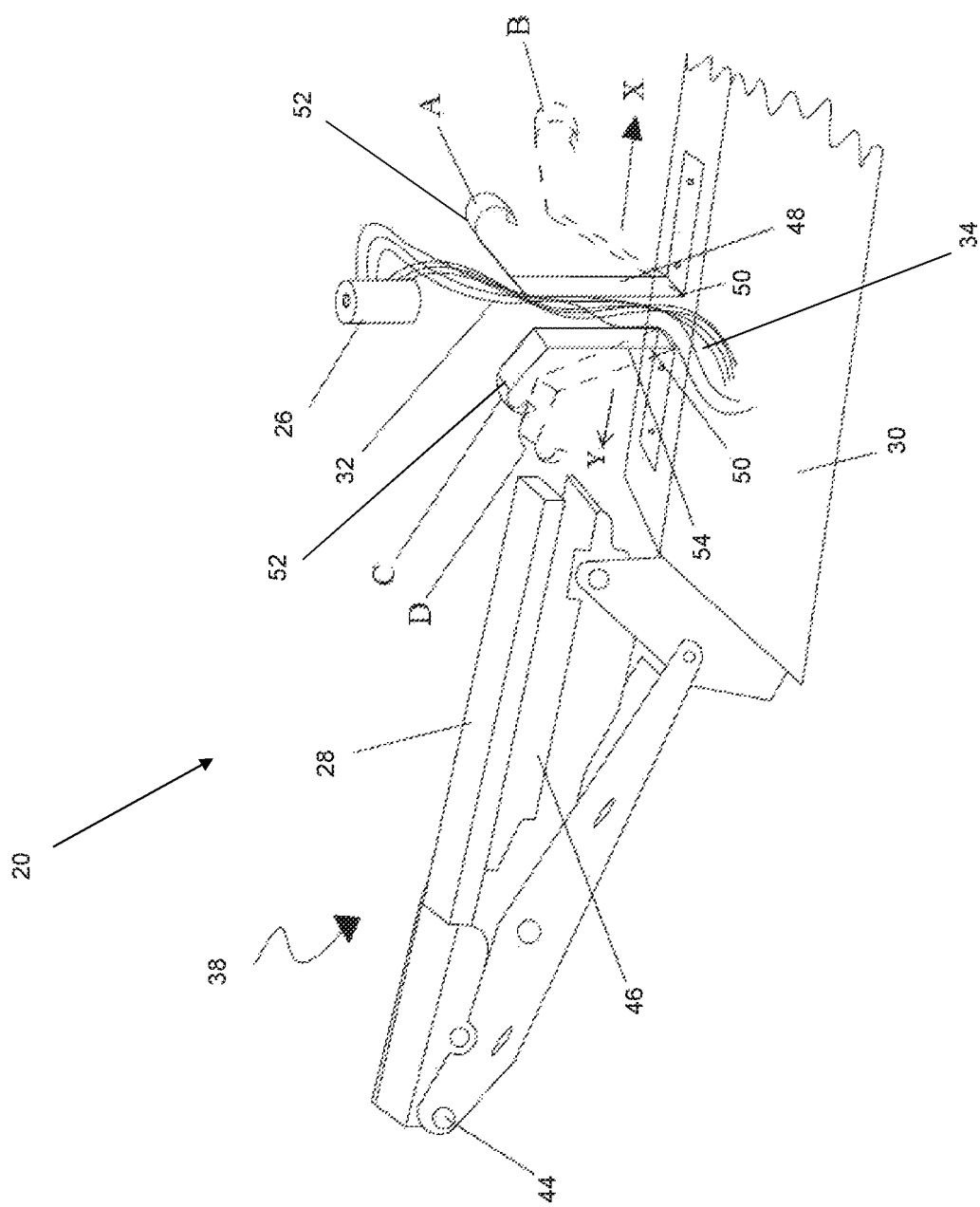
FIG. 2 is a schematic of a second embodiment of the clamp mechanism of FIG. 1 of a wrapping arrangement for an agricultural round baler.

Referring to FIG. 2, a second embodiment of the clamp mechanism 38 is shown mounted on the support frame member 30 proximate to the end of the cutting knife 28 distal from the transverse pivot 44. The clamp mechanism 38 includes a first and a second profiled resilient element 48 and 54. The profiled resilient elements 48 and 54 have also a fixed end 50 and a free end 52, distal from the fixed end 50. The fixed end 50 is fixedly mounted to the support frame member 30. The clamp mechanism 38 includes a clamping portion (not particularly indicated) between the free ends 52 and the fixed ends 50. The first profiled resilient element 48 is displaceable between an operative clamping configuration A and an operative de-clamping configuration B. The second profiled resilient element 54 is displaceable between an operative clamping configuration C and an operative de-clamping configuration D. The profiled resilient elements 48 and 54 are displaceable in opposing direction X and Y respectively, as indicated in FIG. 2, by a displacement force. The profiled resilient elements 48 and 54, due to its resilient nature, tends to return to the operative clamping configuration A and C.

In preparing the agricultural baler 10, the operator is required to displace the profiled resilient elements 48 and 54 to the respective operative de-clamping configuration B and D. Thereafter, the operator is required to position the free end 34 of the wrap material 32 extending from the wrap material supply 26 between the profiled resilient elements 48 and 54. The free end 34 of the wrap material 32 is held between the profiled resilient elements 48 and 54 by the biasing clamping force.

Once the wrapping of the bale is complete, the cutting knife 28 is actuated to be displaced from the resting configuration, illustrated in FIG. 2, about the pivot 44 to a pre-severing configuration. Thereafter, the cutting knife 28 is displaced back to the resting configuration. While moving from the pre-severing configuration to the resting configuration, the cutting knife 28 severs the wrap material 32 in between the profiled resilient elements 48 and 54 and the wrap material supply 26. After severing the wrap material 32, the subsequent free end of the wrap material 32 thus formed is gripped between the cutting knife 28 and the anvil 46. The portion of the free end 34 of the wrap material 32 which had been clamped by the clamping mechanism 38 remains clamped to the clamp mechanism 38, until removed by intervention of the operator or any further intentional operation.

Figure 3:
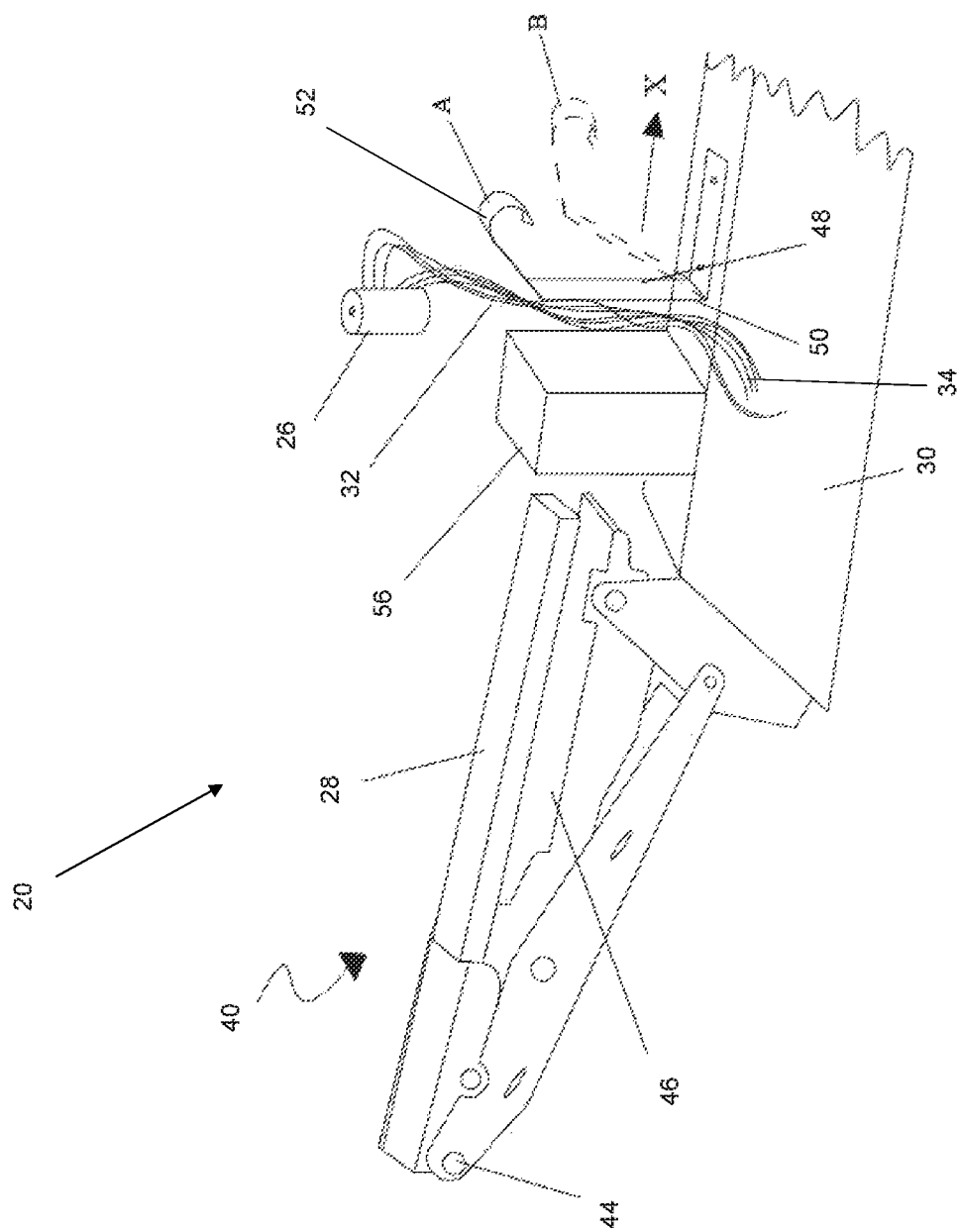
FIG. 3 is a schematic of the second embodiment of the clamp mechanism of FIG. 1 of a wrapping arrangement for an agricultural round baler.

Referring to FIG. 3, a third embodiment of the clamp mechanism 40 is illustrated mounted on the support frame member 30 proximate to the end of the cutting knife 28 distal from the transverse pivot 44. The clamp mechanism 40 includes a stationary element 56 and a profiled resilient element 48. The profiled resilient element 48, as described above, has a fixed end 50 and a free end 52, distal from the fixed end 50. The fixed end 50 is fixedly mounted to the support frame member 30. The clamp mechanism 40 includes a clamping portion (not particularly indicated) between the free end 52 and the fixed end 50. The stationary element 56 is either integrally formed or discretely mounted on the support frame member 30 of the wrapping mechanism 22. In being displaced between an operative clamping configuration A and an operative de-clamping configuration B, the profiled resilient element 48 is moved towards and away from the stationary element 56. The profiled resilient element 48 is displaceable in opposing direction X, as indicated in FIG. 3, by a displacement force. The profiled resilient element 48, due to its resilient nature, tends to return to the operative clamping configuration A.

In preparing the agricultural baler 10, the operator is required to displace the profiled resilient element 48 to the operative de-clamping configuration B. Thereafter, the operator is required to position the free end 34 of the wrap material 32, extending from the wrap material supply 26 between the profiled resilient element 48 and the stationary element 56. The free end 34 of the wrap material 32 is held between the profiled resilient element 48 and the stationary element 56 by a biasing clamping force.

Once the wrapping of the bale is complete, the cutting knife 28 is actuated to be displaced from the resting configuration, illustrated in FIG. 3, about the pivot 44 to a pre-severing configuration. Thereafter, the cutting knife 28 is displaced back to the resting configuration. While moving from the pre-severing configuration to the resting configuration, the cutting knife 28 severs the wrap material 32 in between the profiled resilient element 48 and the wrap material supply 26. After severing the wrap material 32, the subsequent free end of the wrap material 32 thus formed is gripped between the cutting knife 28 and the anvil 46. The portion of the free end 34 of the wrap material 32 which had been clamped by the clamping mechanism 40 remains clamped thereto, until removed by intervention of the operator or any further intentional operation.

Figure 4:
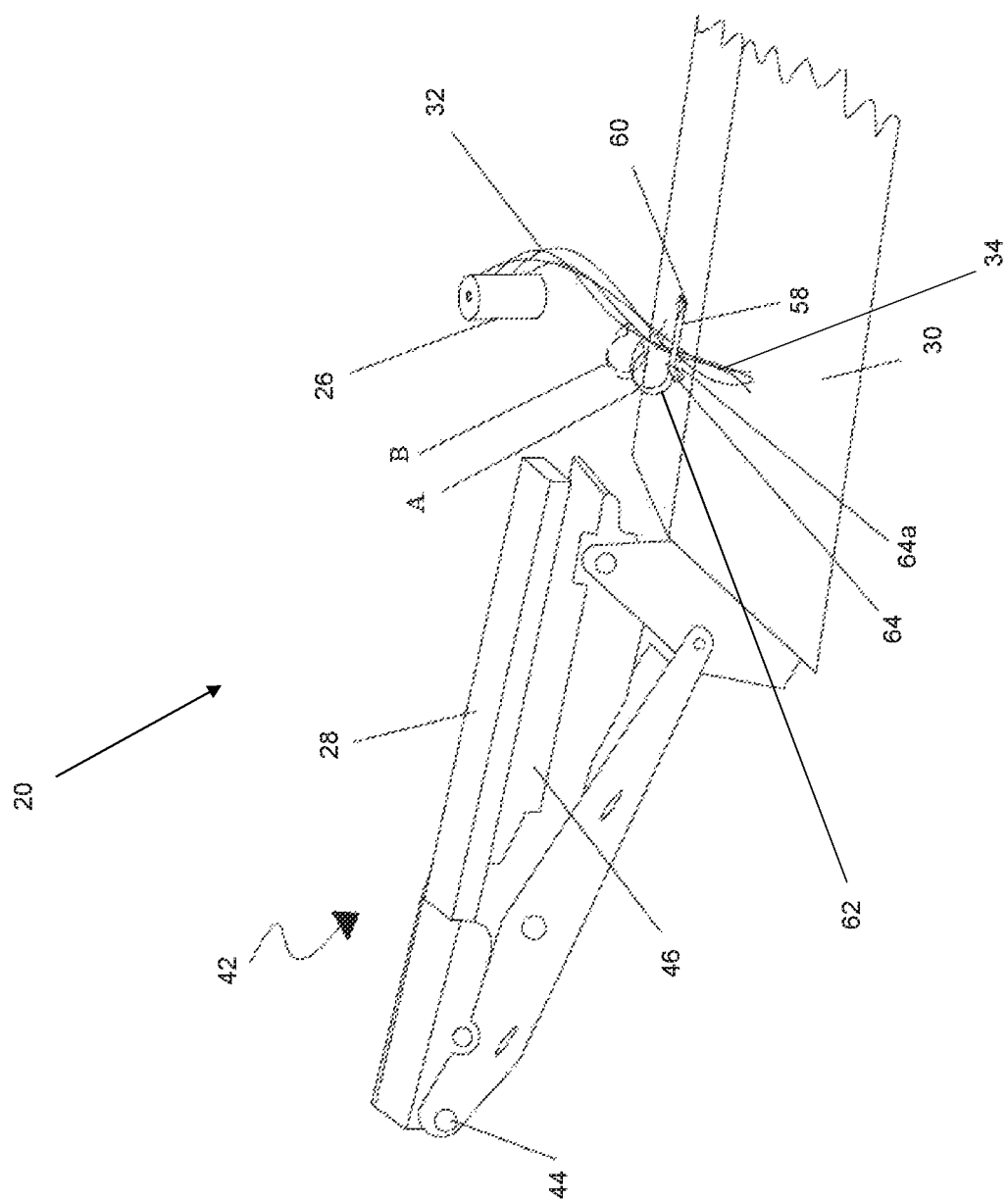
FIG. 4 is a schematic of a second embodiment of the clamp mechanism of FIG. 1 of a wrapping arrangement for an agricultural round baler.
Figure 5:
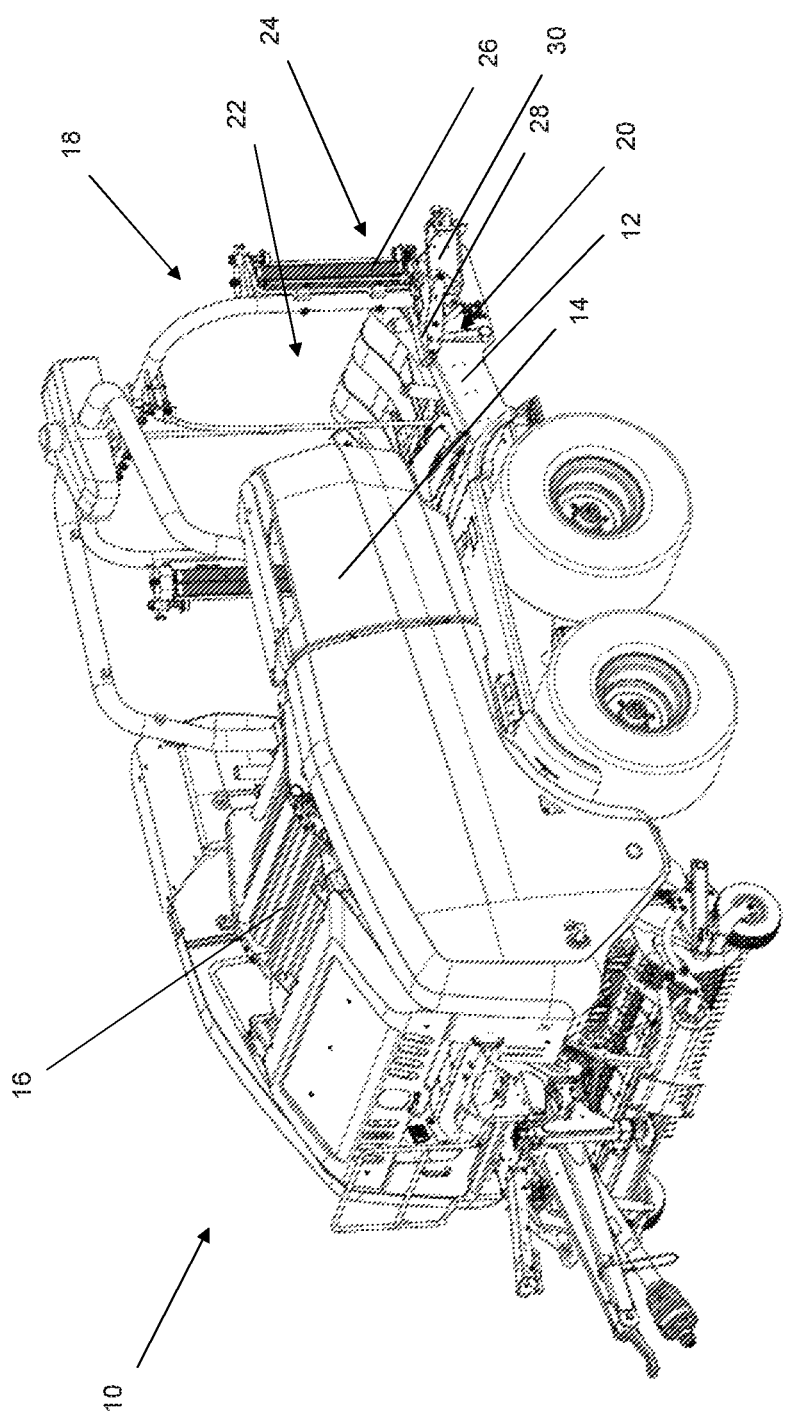
FIG. 5 is a schematic of an agricultural round baler with a wrapping arrangement.

Referring to FIG. 4, a fourth embodiment of the clamp mechanism 42 is shown mounted on the support frame member 30 proximate to the end of the cutting knife 28 distal from the transverse pivot 44. The clamp mechanism 42 includes a profiled resilient element 58. The profiled resilient element 58 has a hinged end 60 and a free end 62, distal from the hinged end 60. The hinged end 60 is hinged to the support frame member 30. The clamp mechanism 42 includes a clamping portion (not particularly indicated) between the hinged end 60 and the free end 62. The profiled resilient element 58 is displaceable between an operative clamping configuration A and an operative de-clamping configuration B. In being displaced between the operative clamping configuration A and the operative de-clamping configuration B, the profiled resilient element 58 is moved about the hinged end 60. A locking means 64 is provided on the support frame member 30 to hold the free end 62 of the profiled resilient element 58 in the operative clamping configuration A. In order to displace the profiled resilient element 58 to the operative de-clamping configuration B, the locking means 64 is displaced to be at a released position 64a.

In preparing the agricultural baler 10, the operator is required to displace the profiled resilient element 58 to the operative de-clamping configuration B. Thereafter, the operator is required to position the free end 34 of the wrap material 32, extending from the wrap material supply 26 between the profiled resilient element 58 and the support frame member 30 by a biasing clamping force.

Once the wrapping of the bale is complete, the cutting knife 28 is actuated to be displaced about the pivot 44 from the resting configuration, illustrated in FIG. 4, to a pre-severing configuration. Thereafter, the cutting knife 28 is displaced back to the resting configuration, illustrated in FIG. 4. While moving from the pre-severing configuration to the resting configuration, the cutting knife 28 severs the wrap material 32 in between the profiled resilient element 58 and the wrap material supply 26. After severing the wrap material 32, the subsequent free end of the wrap material 32 thus formed is gripped between the cutting knife 28 and the anvil 46 for rest of the operation of the agricultural round baler. The portion of the free end 34 of the wrap material 32, which had been initially positioned by the operator to be clamped by the clamping mechanism 42, remains clamped to the clamp mechanism 42 until removed by intervention of the operator or any further intentional operation.

In the clamp mechanism 36, 38, 40, 42, illustrated in FIG. 1, FIG. 2, FIG. 3 and FIG. 4, the profiled resilient elements 48, 54, 58 are made of metal, compound, alloy, polymeric or a combination thereof. In the clamp mechanisms 36, 38, 40, illustrated in FIG. 1, FIG. 2 and FIG. 3, the displacement of the profiled resilient elements 48, 54 generates elastic energy due to the resilient nature of the respective profiled resilient element 48, 54.

Thus, the clamp mechanisms 36, 38, 40, 42, illustrated in FIG. 1, FIG. 2, FIG. 3 and FIG. 4, eliminates handling of the cutting knife 28 by the operator for initially positioning the free end 34 of the wrap material 32 for preparing the agricultural baler for operation. This ensures in minimizing accidents and thereby improving safety in operation of the agricultural baler. It further prevents the falling down of residual wrap material to the ground, so that the clamped free end 34 of wrap material 32 remains until manual removal.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wrapping arrangement for an agricultural round baler, comprising:
   a support frame having a frame member;
   a wrapping mechanism including at least one wrap material feeding means mounted on the support frame, the at least one wrap material feeding means including a supply of wrap material;
   at least one wrap material clamp and cutting device operably mounted to the at least one wrap material feeding means; and
   a clamp mechanism mounted proximate to the at least one wrap material clamp and cutting device, the clamp mechanism including a profiled resilient element mounted on the frame member and moveable between an operative clamping configuration and an operative de-clamping configuration, and a stationary element positioned against the profiled resilient element when the profiled resilient element is disposed in the operative clamping configuration for engaging the wrap material directly between the stationary element and the profiled resilient element in clamping engagement, wherein the profiled resilient element is elastically displaceable between the operative clamping configuration and the operative de-clamping configuration to apply a biasing clamping force against the stationary element for pre-positioning the wrap material for functional operation with the wrapping mechanism.

2. The wrapping arrangement of claim 1, wherein the stationary element is integrally formed on the frame member of the wrapping mechanism.

3. The wrapping arrangement of claim 1, wherein, in the operative clamping configuration, the profiled resilient element applies a clamping force against the stationary element.

4. The wrapping arrangement of claim 1, wherein, in the operative de-clamping configuration, the profiled resilient element is displaced away from the stationary element thereby relieving the clamping force.

5. The wrapping arrangement of claim 1, wherein the profiled resilient element is displaceable from the operative clamping configuration to the operative de-clamping configuration by applying a displacement force, where the displacement force generates elastic energy in the profiled resilient element.

6. The wrapping arrangement of claim 1, wherein an initial free end of the wrap material remains clamped to the clamp mechanism.

7. An agricultural round baler, comprising:
   a support frame having a frame member;
   a baling chamber supported by the support frame;
   a wrapping mechanism including at least one wrap material feeding means mounted on the support frame, the at least one wrap material feeding means including a supply of wrap material;
   at least one wrap material clamp and cutting device operably mounted to the at least one wrap material feeding means; and
   a clamp mechanism mounted proximate to the at least one wrap material clamp and cutting device, the clamp mechanism including a profiled resilient element mounted on the frame member and moveable between an operative clamping configuration and an operative de-clamping configuration, and a stationary element positioned against the profiled resilient element when the profiled resilient element is disposed in the operative clamping configuration for engaging the wrap material directly between the stationary element and the profiled resilient element in clamping engagement, wherein the profiled resilient element is elastically displaceable between the operative clamping configuration and the operative de-clamping configuration to apply a biasing clamping force against the stationary element for pre-positioning the wrap material for functional operation with the wrapping mechanism.

8. The agricultural round baler of claim 7, wherein the stationary element is integrally formed on the frame member of the wrapping mechanism.

9. The agricultural round baler of claim 7, wherein, in the operative clamping configuration, the profiled resilient element applies a clamping force against the stationary element.

10. The agricultural round baler of claim 7, wherein, in the operative de-clamping configuration, the profiled resilient element is displaced away from the stationary element thereby relieving the clamping force.

11. The agricultural round baler of claim 7, wherein the profiled resilient element is displaceable from the operative clamping configuration to the operative de-clamping configuration by applying a displacement force, where the displacement force generates elastic energy in the profiled resilient element.

12. The agricultural round baler of claim 7, wherein an initial free end of the wrap material remains clamped to the clamp mechanism.

* * * * *